United States Patent
Ratcliffe, Jr. et al.

(10) Patent No.: US 12,079,670 B2
(45) Date of Patent: *Sep. 3, 2024

(54) APPLICATION PROGRAMMING INTERFACE FOR SCRAPING DATA ACROSS PLATFORMS

(71) Applicant: Truist Bank, Charlotte, NC (US)

(72) Inventors: Ronald Lee Ratcliffe, Jr., Garner, NC (US); Reinaldo Gamaliel Rivera Colon, Raleigh, NC (US); Jennifer Merten, Brookhaven, GA (US)

(73) Assignee: Truist Bank, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,260

(22) Filed: Oct. 17, 2023

(65) Prior Publication Data

US 2024/0045740 A1    Feb. 8, 2024

Related U.S. Application Data

(63) Continuation of application No. 17/847,274, filed on Jun. 23, 2022, now Pat. No. 11,822,977.

(51) Int. Cl.
   *G06F 3/00* (2006.01)
   *G06F 9/54* (2006.01)
   *G06F 16/16* (2019.01)

(52) U.S. Cl.
   CPC ............ *G06F 9/541* (2013.01); *G06F 16/162* (2019.01)

(58) Field of Classification Search
   CPC .......................................................... G06F 9/54
   See application file for complete search history.

(56) References Cited

U.S. PATENT DOCUMENTS

| | | | |
|---|---|---|---|
| 11,126,324 B2* | 9/2021 | Schon | G06F 9/451 |
| 2015/0254645 A1 | 9/2015 | Bondesen et al. | |
| 2017/0006135 A1 | 1/2017 | Siebel et al. | |
| 2017/0076271 A1* | 3/2017 | Jones-Mcfadden | G06Q 20/405 |
| 2018/0005323 A1 | 1/2018 | Grassadonia | |
| 2019/0391825 A1* | 12/2019 | Jann | G06F 3/0482 |
| 2020/0074449 A1* | 3/2020 | Novis | G06Q 20/227 |
| 2020/0076813 A1 | 3/2020 | Felice-Steele et al. | |
| 2020/0137105 A1 | 4/2020 | Endler | |

(Continued)

OTHER PUBLICATIONS

Jan Ciesko, Programmable and Scalable Reductions on Clusters. (Year: 2013).*

*Primary Examiner* — Lechi Truong

(74) *Attorney, Agent, or Firm* — Kilpatrick Townsend & Stockton LLP; Michael A. Springs, Esq.

(57) ABSTRACT

An application-programming interface for scraping data across platforms is provided. For example, a computing system use an application programming interface to scrape a first set of data from a first database associated with a first application and a second set of data from a second database associated with a second application. The computing system can determine a portion of the first set of data and the second set of data that is relevant to a user account. The computing system can generate a user score for the user account indicating a financial health progress based on the first set of data and the second set of data. The computing system can output the portion of the first set of data and the second set of data and the user score for display on a graphical user interface associated with the user account.

14 Claims, 3 Drawing Sheets

(56) References Cited

U.S. PATENT DOCUMENTS

2020/0387625 A1   12/2020  Saad
2023/0377057 A1*  11/2023  Hayes, III ................. G06F 8/61

* cited by examiner

APPLICATION PROGRAMMING INTERFACE FOR SCRAPING DATA ACROSS PLATFORMS

CROSS-REFERENCE TO RELATED APPLICATIONS

The present application is a continuation of U.S. patent application Ser. No. 17/847,274, filed Jun. 23, 2022 and titled "Application Programming Interface for Scraping Data Across Platforms," the entirety of which is hereby incorporated by reference herein.

TECHNICAL FIELD

The present disclosure relates to application programming interfaces. More specifically, but not by way of limitation, this disclosure relates to application-programming interfaces for scraping data across platforms.

BACKGROUND

Online and mobile banking applications can allow users to interact with a financial institution's products and services by accessing their user account. In some cases, the products and services can include financial literacy content displayed on a graphical user interface that focuses on teaching and advising users on financial literacy principles such as budgeting, investing, or saving.

SUMMARY

In one example, a system can include a processor and a non-transitory computer-readable memory. The non-transitory computer-readable memory can include instructions that are executable by the processor for causing the processor to perform operations. The operations can include scraping, by an application programming interface, a first set of data from a first database associated with a first application and a second set of data from a second database associated with a second application. The operations can include determining a portion of the first set of data and the second set of data that is relevant to a user account. The operations can include generating, based on the first set of data and the second set of data, a user score for the user account indicating a financial health progress. The operations can include outputting the portion of the first set of data and the second set of data and the user score for display on a graphical user interface associated with the user account.

In another, a method can include scraping, by an application programming interface, a first set of data from a first database associated with a first application and a second set of data from a second database associated with a second application. The method can include determining, by a processor, a portion of the first set of data and the second set of data that is relevant to a user account. The method can include generating, by the processor and based on the first set of data and the second set of data, a user score for the user account indicating a financial health progress. The method can include outputting, by the processor, the portion of the first set of data and the second set of data and the user score for display on a graphical user interface associated with the user account.

In yet another example, a non-transitory computer-readable medium can comprise program code that is executable by the processor for causing the processor to perform operations. The operations can include scraping, by an application programming interface, a first set of data from a first database associated with a first application and a second set of data from a second database associated with a second application. The operations can include determining a portion of the first set of data and the second set of data that is relevant to a user account. The operations can include generating, based on the first set of data and the second set of data, a user score for the user account indicating a financial health progress. The operations can include outputting the portion of the first set of data and the second set of data and the user score for display on a graphical user interface associated with the user account.

DETAILED DESCRIPTION

Certain aspects and features relate to using an application programming interface ("API") to scrape data across different platforms within a computing environment, such as a distributed computing environment. In one example, a computing environment for a financial institution may provide financial products and services to users through applications accessed via user accounts. Each application may be associated with a database storing application data, such as financial literacy content. Additionally, the databases may store user activity behavior recorded from users interacting with the applications via their user accounts. Using an API to scrape data from each database to be combined, stored, and analyzed in a central location may allow the computing environment to provide specialized content to individual user accounts. The computing environment may also store deduplicated versions of portions of the data from the databases in the central location. Some or all of the original portions of the data in the databases can be deleted, which can significantly reduce memory storage for the computing environment.

The API can scrape personal data relating to a particular user account. The personal data may include user activity observations relating to user account interactions with the applications. The personal data may also include personal financial data. Additionally or alternatively, the API can scrape anonymized data relating to multiple users across multiple user accounts. The computing environment can analyze the scraped data to generate scores representing progress to financial health goals. Examples of financial health goals can include a debt reduction goal or a house down payment savings goal. The computing environment may also determine relevant data, such as relevant financial literacy content, from existing applications. The relevant financial literacy content can then be incorporated into an additional application that can be accessed via the user account. In some examples, the relevant data can be determined using the user score. For example, the user score may indicate that financial literacy content relating to budgeting may be beneficial to the user. The computing environment may incorporate financial literacy content related to budgeting into the additional application.

These illustrative examples are given to introduce the reader to the general subject matter discussed here and are not intended to limit the scope of the disclosed concepts. The following sections describe various additional features and examples with reference to the drawings in which like numerals indicate like elements.

Figure 1:
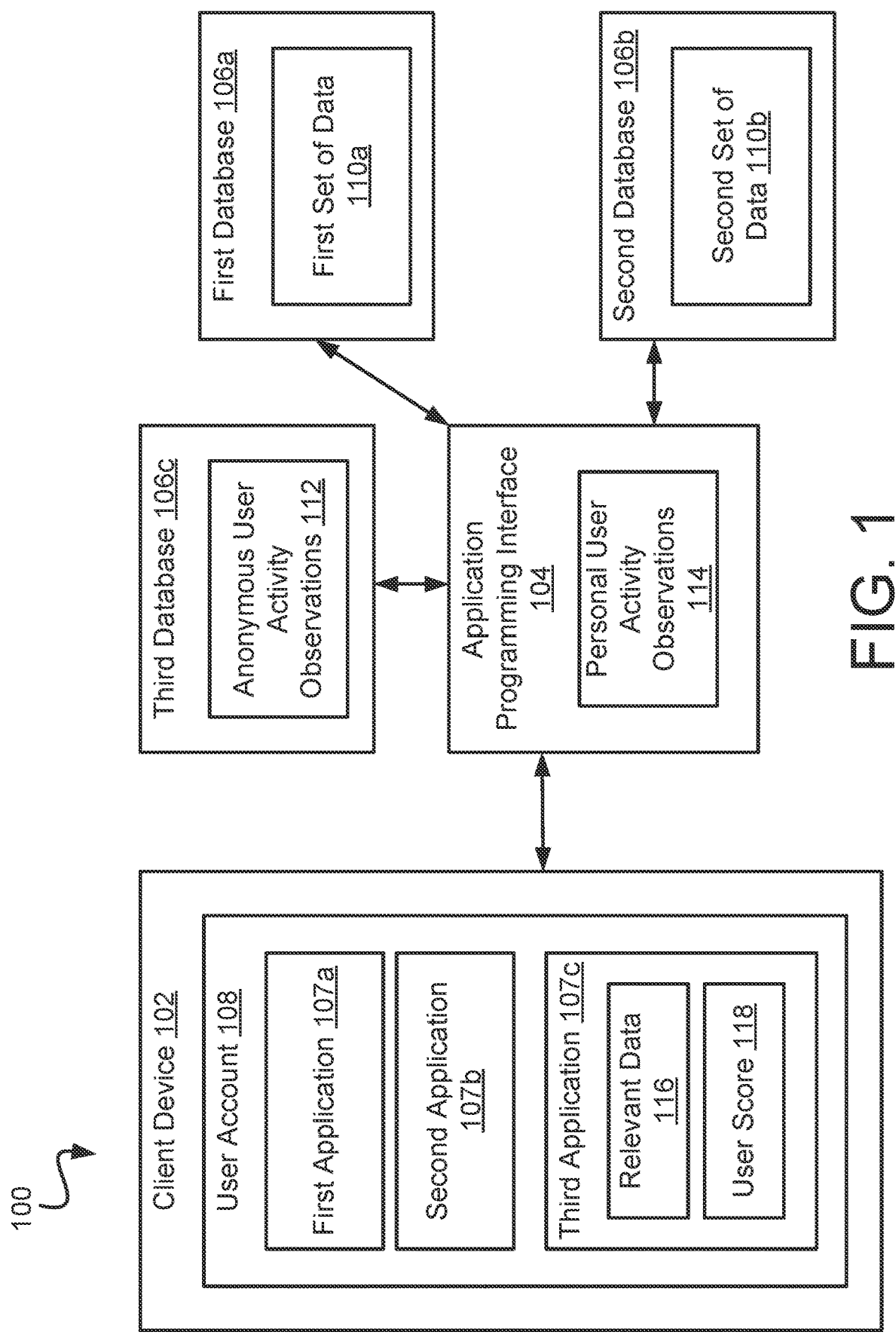
FIG. 1 is a block diagram of an example of a computing environment including an application programming interface for scraping data across platforms according to some aspects of the present disclosure.

FIG. 1 is a block diagram of an example of a computing environment 100 including an application programming interface ("API") 104 for scraping data across platforms according to some aspects of the present disclosure. The computing environment 100 can include a client device 102, an API 104, and multiple databases 106. Each communication within the computing environment 100 may occur over one or more data networks, such as a public data network, a private data network, or some combination thereof. A data network may include one or more of a variety of different types of networks, including a wireless network, a wired network, or a combination of a wired and a wireless network. Examples of suitable networks include the Internet, a personal area network, a local area network ("LAN"), a wide area network ("WAN"), or a wireless local area network ("WLAN").

The client device 102 can implement one or more applications 107 using the user account 108 to access user account information and to perform application functions. Each application 107 can be associated with a database 106. The databases 106 can store any information necessary for the client device 102 to implement any functions of an application 107 in relation to the user account 108. The databases 106 may also include user activity observations associated with a user accessing the applications 107 via the user account 108. Examples of user activity observations can include mouse movements, key logging, web page history, and any other activity observations relating to accessing the applications 107. The user activity observations may include observations relating to the user account 108, or anonymous observations relating to multiple user accounts. Examples of the client device 102 can include desktop computers, videogame consoles, mobile phones (e.g., cellular phones), PDAs, tablet computers, net books, laptop computers, hand-held specialized readings, and wearing devices such as smart watches.

In one example, a first application 107a associated with a first database 106a can be a financial wellness program directed to teaching users financial literacy principles. The first database 106a can store financial literacy articles, modules, and more that are accessible via the first application 107a. A second application 107b associated with a second database 106b can be an application including financial literacy games. Users may interact with the second application 107b to earn in-app coins by meeting financial goals, or by completing financial literacy-focused games such as quizzes. The in-app coins may be exchanged for cash rewards that can be deposited into the user account 108. The second database 106b may store functions and data relating to the financial literacy games. The first database 106a and second database 106b may also include user activity observations collected from user accounts interacting with the first application 107a and second application 107b.

The API 104 may scrape a first set of data 110a from the first database 106a and a second set of data 110b from the second database 106b. The API 104 may data scrape at predetermined time intervals, such as once a week or once a month. Additionally or alternatively, the API 104 may data scrape in response to certain predetermined conditions being met. For example, changes to the user account 108 such as adding a new financial account or loan may prompt the API 104 to data scrape. In some examples, the API 104 may data scrape in response to social, political, or economic events. In some examples, the API 104 may data scrape via screen scraping.

In some examples, the first set of data 110a and the second set of data 110a scraped by the API 104 can be financial literacy content provided by the applications 107a-b. The API 104 may analyze the first set of data 110a associated with the first application 107a to determine financial literacy content to suggest or incorporate into the second application 107b. In one example, the API 104 may determine personal user activity observations 114 from the first set of data 110a. The personal user activity observations 114 may indicate that the user is spending a significant amount of time reading articles on the first application 107a related to house buying. The API 104 may determine, based on the personal user activity observations 114, that financial literacy games or quizzes relating to home loans, mortgages, and home buying assistance programs should be suggested to the user in the second application 107b. In another example, the API 104 may determine personal user activity observations 114 from the second set of data 110b. The personal user activity observations 114 may indicate that the user has failed multiple quizzes in the second application 107b relating to budgeting. The API 104 may determine, based on the personal user activity observations 114, that articles relating to budgeting should be suggested to the user in the first application 107a. In some examples, the API 104 may determine that financial literacy content in one application should be incorporated into another application.

For example, the computing environment 100 may include a third application 107c associated with a third database 106c for storing information necessary for the client device 102 to access functions of the third application 107c. The third application 107c may also be directed to providing financial literacy content to the user of the client device 102. The API 104 may determine relevant data 116 from the first set of data 110a and the second set of data 110b. The API 104 can incorporate the relevant data 116 into the third application 107c. For example, the API 104 may reformat the relevant data 116 based on the requirements and aesthetics of the third application 107c.

In some examples, the API 104 can determine anonymous user activity observations 112 from the first set of data 110a and the second set of data 110b. The API 104 may store the anonymous user activity observations 112 in the third database 106c. The anonymous user activity observations 112 may include personal user activity observations of multiple users of the applications 107 without identifying information. To reduce memory storage in the computing environment 100, the API 104 may deduplicate the anonymous user activity observations 112 prior to storage in the third database 106c. The API 104 may use the deduplicated data rather than the first set of data 110a and the second set of data 110b for operations relating to the anonymous user activity observations 112. After deduplication and storage, the API 104 may delete portions of the first set of data 110a and the second set of data 110b that included the anonymous user activity observations 112 from the first database 106a and the second database 106b.

In some examples, the API 104 can use the personal user activity observations 114 and the anonymous user activity observations 112 to determine a user score 118 for the user account 108. The user score 118 can be a representation of the user's progress towards a financial goal. The financial goal may be inputted by the user into the user account 108, or can be automatically generated by the computing environment 100. In some examples, the user score 118 can represent the user's progress toward a financial goal as compared to the anonymous user activity observations 112. In one example, the user score 118 can represent progress towards paying off credit card debt. The user score 118 can be based on a portion of the credit card debt that is payed off, determined from the personal user activity observations 114. Alternatively or additionally, the user score 118 can be based on the anonymous user activity observations 112. For example, the user score 118 may be generated by comparing the user's progress towards paying off credit card debt as compared to anonymous users with similar amounts of credit card debt. In some examples, the user score 118 may represent an overall financial health score. In some examples, the relevant data 116 may be determined based on the user score 118. For example, if the user's progress towards paying off credit card debt is relatively low, the API 104 may determine relevant data 116 from the first database 106*a* and the second database 106*b* relating to credit card debt to be incorporated into the third application 107*c*.

The numbers of devices depicted in FIG. 1 are provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the API 104 and the databases 106*a-c*, may instead be implemented in a single device or system.

Figure 2:
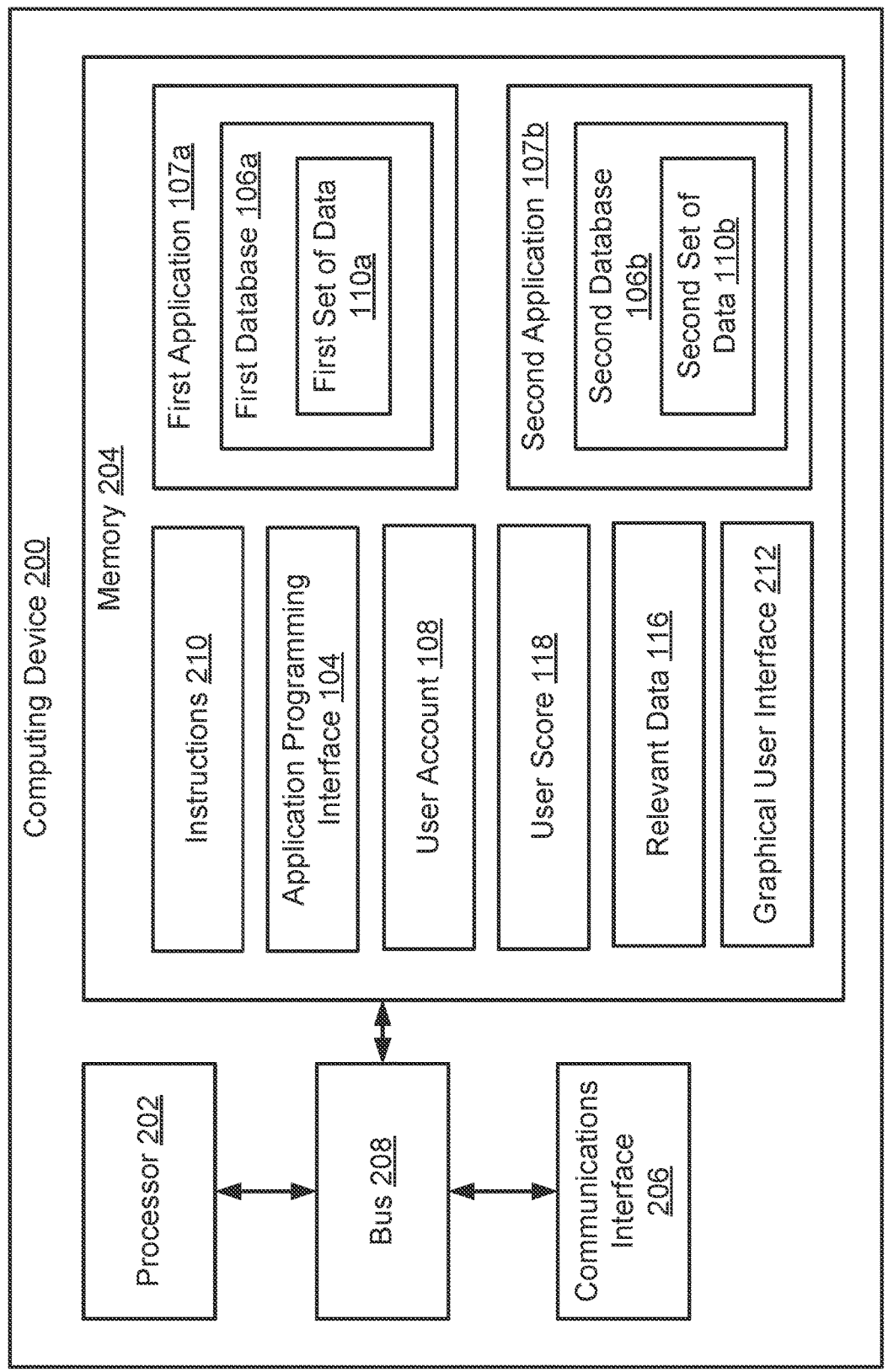
FIG. 2 is a block diagram of an example of a computing device including an application programming interface for scraping data across platforms according to some aspects of the present disclosure.

FIG. 2 is a block diagram of an example of a computing device 200 including an application programming interface (API) 104 for scraping data across platforms according to some aspects of the present disclosure. For example, the computing device 200 may be used as the computing environment 100 from FIG. 1. The computing device 200 can include a processor 202, a memory 204, and a communications interface 206 that are communicatively connected via a bus 208. In some examples, the components shown in FIG. 2 can be integrated into a single structure. For example, the components can be within a single housing. In other examples, the components shown in FIG. 2 can be distributed (e.g., in separate housings) and in electrical communication with each other.

The processor 202 can execute one or more operations for implementing some examples. The processor 202 can execute instructions 210 stored in the memory 204 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 can be communicatively coupled to the memory 204. The non-volatile memory 204 may include any type of memory device that retains stored information when powered off. Non-limiting examples of the memory 204 include electrically erasable and programmable read-only memory ("EEPROM"), flash memory, or any other type of non-volatile memory. In some examples, at least some of the memory 204 can include a medium from which the processor 202 can read instructions. A computer-readable medium can include electronic, optical, magnetic, or other storage devices capable of providing the processor 202 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The memory 204 can include a user account 108. The user account 108 can be a financial account associated with a financial institution. The memory 204 can also include a first application 107*a* and a second application 107*b* that include a first database 106*a* and a second database 106*b*, respectively. The memory 204 can include an application programming interface (API) 104 that can scrape a first set of data 110*a* from the first database 106*a* and a second set of data 110*b* from the second database 106*b*. The memory 204 can include instructions causing the processor 202 to determine a portion of the first set of data 110*a* and the second set of data 110*b* that is relevant data 116 for the user account 108. The memory 204 can include instructions causing the processor 202 to generate a user score 118 for the user account 108 based on the first set of data 110*a* and the second set of data 110*b*. The memory 204 can also include instructions causing the processor 202 to output the relevant data 116 and the user score 118 for display on a graphical user interface 212 associated with the user account 108 via the communications interface 206.

Figure 3:
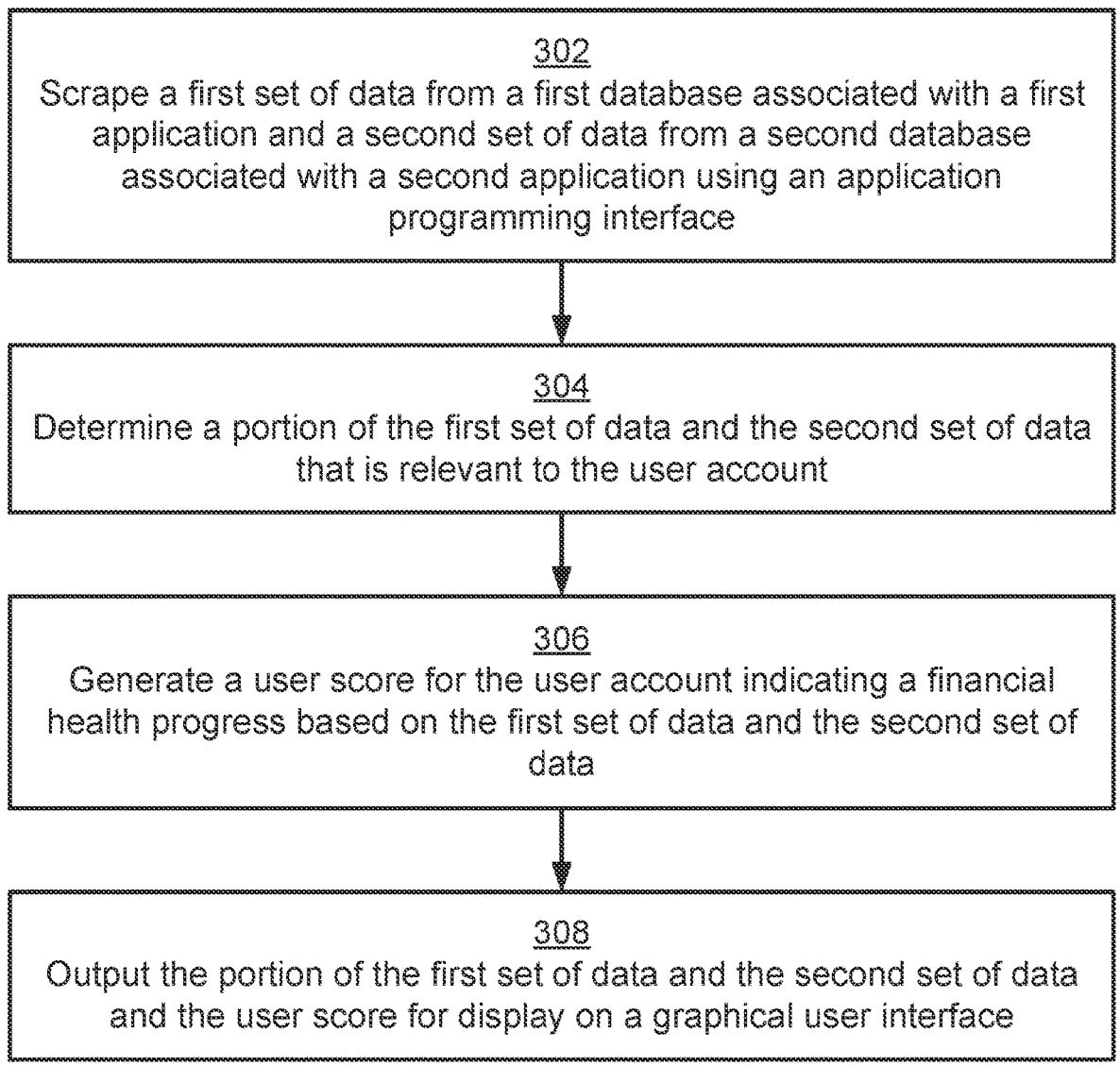
FIG. 3 is a flowchart illustrating an example of a process for using an application programming interface to scrape data across platforms according to some aspects of the present disclosure.

FIG. 3 is a flowchart illustrating an example of a process for using an application programming interface to scrape data across platforms according to some aspects of the present disclosure. The process of FIG. 3 can be implemented by the computing environment 100 of FIG. 1 or the computing device 200 of FIG. 2, but other implementations are also possible. At block 302, the processor 202 can scrape a first set of data 110*a* from a first database 106*a* associated with a first application 107*a* and a second set of data 110*b* from a second database 106*b* associated with a second application 107*b* using an application programming interface (API) 104. The first set of data 110*a* and the second set of data 110*b* may include financial literacy content displayed in the first application 107*a* and the second application 107*b*. Additionally or alternatively, the first set of data 110*a* and the second set of data 110*b* may include user activity observations relating to user accounts 108 interacting with the first application 107*a* and the second application 107*b*.

At block 304, the processor 202 can determine a portion of the first set of data 110*a* and the second set of data 110*b* that is relevant data 116 to the user account 108. For example, the processor 202 can determine a set of personal user activity observations 114 from the user account 108 accessing the first application 107*a* and the second application 107*b*. For example, the set of personal user activity observations 114 can include time spent interacting with various aspects of the first application 107*a* and the second application 107*b*. The processor 202 can also determine a set of anonymous user activity observations 112 based on multiple user accounts 108 accessing the first application 107*a* and the second application 107*b*. The processor 202 can determine the relevant data 116 from the personal user activity observations 114 and the anonymous user activity observations 112. In some examples, the processor 202 can dedpulicate the set of anonymous user activity observations 112 to generate a set of deduplicated data. The set of deduplicated data may require significantly less storage space than the set of anonymous user activity observations 112. The processor 202 can store the set of deduplicated data, such as in a third database 106c, and can delete the first set of data 110a and the second set of data 110b from the first database 106a and the second database 106b.

At block 306, the processor 202 can generate a user score 118 for the user account 108 indicating a financial health progress based on the first set of data 110a and the second set of data 110b. In some examples, the user score 118 can be generated by the processor 202 comparing the set of personal user activity observations 114 for the user account 108 to the anonymous user activity observations 112. In some examples, the processor 202 may determine the relevant data 116 based on the user score 118. For example, the processor 202 may determine that the user score 118 is relatively low compared to the anonymous user activity observations 112 based on a user of the user account 108 having a low credit score. The processor 202 may determine relevant data 116 from the first application 107a and the second application 107b relating to increasing credit scores. At block 308, the processor 202 can output the relevant data 116 and the user score 118 for display on a graphical user interface 212. For example, the processor 202 can output the relevant data 116 and the user score 118 as a graphical user interface 212 to a client device 102.

The foregoing description of certain examples, including illustrated examples, has been presented only for the purpose of illustration and description and is not intended to be exhaustive or to limit the disclosure to the precise forms disclosed. Numerous modifications, adaptations, combinations, and uses thereof are possible without departing from the scope of the disclosure.

What is claimed is:

1. A system comprising:
   a processor; and
      a non-transitory computer-readable memory comprising instructions that are executable by the processor for causing the processor to:
         obtain a first set of data from a first database associated with a first application;
      generate, based on the first set of data, a user score for a user account used to access the first application, the user score indicating a financial health progress;
      determine financial literacy content to recommend to the user account based on the user score; reformat the financial literacy content from a first format associated with the first application to a second format associated with a second application; and
      output the financial literacy content in the second format for display in a graphical user interface of the second application, the graphical user interface being accessible via the user account;
      wherein the memory further comprises instructions that are executable by the processor for causing the processor to: determine, from the first set of data, a set of personal user activity observations from the user account used to access the first application; and determine, from the first set of data, a set of anonymous user activity observations from a plurality of user accounts used to access the first application;
      wherein the memory further comprises instructions that are executable by the processor for causing the processor to: deduplicate the set of anonymous user activity observations to generate a set of deduplicated data; store the set of deduplicated data in a second database; and
   delete the first set of data from the first database.

2. The system of claim 1, wherein the memory further comprises instructions that are executable by the processor for causing the processor to generate the user score by:
   comparing the set of personal user activity observations to the set of anonymous user activity observations.

3. The system of claim 1, wherein the memory further comprises instructions that are executable by the processor for causing the processor to generate the user score by:comparing the set of personal user activity observations to the set of deduplicated data in the second database.

4. The system of claim 1, wherein the memory further comprises instructions that are executable by the processor for causing the processor to:obtain the first set of data via screen scraping.

5. The system of claim 1, wherein the first set of data comprises mouse movements, key logging, or web page history associated with the user account used to access the first application or the second application.

6. A method comprising:
   obtaining, by a processor, a first set of data from a first database associated with a first application;
   generating, by the processor and based on the first set of data, a user score for a user account used to access the first application, the user score indicating a financial health progress;
   determining, by the processor, financial literacy content to recommend to the user account based on the user score;
   reformatting, by the processor, the financial literacy content from a first format associated with the first application to a second format associated with a second application; and
   outputting, by the processor, the financial literacy content in the second format for display in a graphical user interface of the second application, the graphical user interface being accessible via the user account;
   determining, from the first set of data, a set of personal user activity observations from the user account used to access the first application and the second application; and determining, from the first set of data, a set of anonymous user activity observations from a plurality of user accounts used to access the first application and the second application;
   deduplicating the set of anonymous user activity observations to generate a set of deduplicated data; storing the set of deduplicated data in a second database; and deleting the first set of data from the first database.

7. The method of claim 6, wherein generating the user score further comprises:
   comparing the set of personal user activity observations to the set of anonymous user activity observations.

8. The method of claim 6, wherein generating the user score further comprises: comparing the set of personal user activity observations to the set of deduplicated data.

9. The method of claim 6, further comprising: obtaining the first set of data via screen scraping.

10. The method of claim 6, wherein the first set of data comprises mouse movements, key logging, or web page history associated with a user accessing the first application or the second application.

11. A non-transitory computer-readable medium comprising program code that is executable by a processor for causing the processor to:
   obtain a first set of data from a first database associated with a first application; generate, based on the first set of data, a user score for a user account used to access the first application, the user score indicating a financial health progress;

determine financial literacy content to recommend to the user account based on the user score; reformat the financial literacy content from a first format associated with the first application to a second format associated with a second application; and output the financial literacy content in the second format for display in a graphical user interface of the second application, the graphical user interface being accessible via the user account;

wherein the program code is further executable by the processor for causing the processor to: determine, from the first set of data, a set of personal user activity observations from the user account used to access the first application; and determine, from the first set of data, a set of anonymous user activity observations from a plurality of user accounts used to access the first application;

wherein the program code is further executable by the processor for causing the processor to: deduplicate the set of anonymous user activity observations to generate a set of deduplicated data; store the set of deduplicated data in a second database; and delete the first set of data from the first database.

12. The non-transitory computer-readable medium of claim 11, wherein the program code is further executable by the processor for causing the processor to generate the user score by:comparing the set of personal user activity observations to the set of anonymous user activity observations.

13. The non-transitory computer-readable medium of claim 11, wherein the program code is further executable by the processor for causing the processor to generate the user score by:comparing the set of personal user activity observations to the set of deduplicated data.

14. The non-transitory computer-readable medium of claim 11, wherein the program code is further executable by the processor for causing the processor to:obtain the first set of data via screen scraping.

* * * * *